United States Patent [19]

Taylor et al.

[11] Patent Number: 5,145,887
[45] Date of Patent: Sep. 8, 1992

[54] HIGH SURFACE AREA MAGNESIA AS HARDENER FOR PHENOLIC RESINS

[75] Inventors: John G. Taylor; Arthur H. Gerber, both of Louisville, Ky.

[73] Assignee: Borden, Inc., Columbus, Ohio

[21] Appl. No.: 680,568

[22] Filed: Apr. 4, 1991

[51] Int. Cl.$^5$ ............................................... B22C 01/22
[52] U.S. Cl. ...................... 523/145; 523/146; 525/480; 525/501; 525/503; 528/129; 528/161
[58] Field of Search ............... 528/140, 129, 144, 161; 525/506, 508, 534, 480, 501, 503; 523/145, 146

[56] References Cited

U.S. PATENT DOCUMENTS

| | | | |
|---|---|---|---|
| Re. 32,720 | 7/1988 | Lemon et al. | 523/145 |
| Re. 32,812 | 12/1988 | Lemon et al. | 523/145 |
| 2,424,787 | 7/1947 | Adams | 260/38 |
| 2,869,191 | 1/1959 | Cooper | 22/147 |
| 2,869,194 | 1/1959 | Cooper | 22/193 |
| 2,869,196 | 1/1959 | Cooper | 22/193 |
| 2,913,787 | 11/1959 | Cooper | 22/193 |
| 4,794,051 | 12/1988 | Gupta | 428/524 |
| 4,831,067 | 5/1989 | Lemon et al. | 523/156 |
| 4,939,188 | 7/1990 | Gerber | 523/146 |
| 5,043,412 | 8/1991 | Chandramouli et al. | 528/147 |

FOREIGN PATENT DOCUMENTS 0094165 11/1983 European Pat. Off. .
0202004 11/1986 European Pat. Off. .
60-90251 5/1985 Japan .

OTHER PUBLICATIONS

Sax, N. and Lewis R., eds., Hawley's Condensed Chemical Dictionary, 11th ed., Van Nostrand Reinhold Co., New York, 1987, p. 718.

Primary Examiner—John Kight, III
Assistant Examiner—Richard L. Jones
Attorney, Agent, or Firm—George P. Maskas; Kenneth P. Van Wyck; Dennis H. Rainear

[57] ABSTRACT

There are disclosed methods and compositions for room temperature hardening of phenolic resole resin refractory compositions containing a magnesium oxide hardening agent alone or together with an organic ester. The resin is a low viscosity, low molecular weight resin having a high free phenol content. The magnesium hardening agent has a surface area of at least 20 square meters per gram. The compositions provide adequate working times and room temperature hardening within 24 hours.

18 Claims, No Drawings

HIGH SURFACE AREA MAGNESIA AS HARDENER FOR PHENOLIC RESINS

This application is related to U.S. patent application Ser. No. 07/562206 which was filed Aug. 2, 1990 by A. H. Gerber and which discloses the use of retarders to delay the hardening of phenolic resole resins admixed with magnesium oxide hardening agents alone or together with esters and U.S. patent application Ser. No. 07/616879 filed by A. H. Gerber on Nov. 21, 1990 which discloses the use of accelerators for the hardening of phenolic resole resins with magnesium oxide hardeners alone or together with an ester. Both of these related applications and the instant application are assigned to the same entity.

BACKGROUND OF THE INVENTION

1. Field of the Invention

This invention relates to the use of phenolic resole resins having a free phenol content of about 15% to 25%, a molar ratio of not more than about 1.5 moles of aldehyde bound with one mole of a phenol in the resin, and lightburned magnesium oxide having a surface area of at least 20 square meters per gram, optionally with an ester functional hardening agent, which can be used with aggregates to produce raw batch compositions for use as refractories. The raw batch compositions exhibit good flow and compaction upon vibration, mix working times of at least 15 minutes and which harden as shaped articles in 24 hours or less at about 23° C. with tensile strengths of at least 75 psi as measured at 25 C. The shaped articles can be thermally cured and further carbonized for use as refractories such as bricks or cast articles.

2. Prior Art

Currently cast-in-place monolithic refractory compositions are prepared by the use of hydraulic setting calcium aluminate cements. Alumina and magnesia (periclase) are major aggregate constituents but silicon carbide, silica, and graphite may also be present. The mixture of refractory cement, water, and aggregate is such that a fluid, pourable, easily vibratable mix results which is transferred to a mold, vibrated and allowed to harden at ambient temperature. Mix consistency and rate of hardening can be controlled by the type of refractory cement, amount of water used, use of dispersants and cement accelerators or retarders. Hardened shapes with mechanical strength result at room temperature, after thermal cure and after carbonizing at temperature in excess of 1,000° C. (1,850° F.). Increasing cement content, i.e., from 4% to 8%, increases strength. However, increasing cement (hydrated) content adversely affects refractory performance in the presence of molten metal such as steel and aluminum. Molten metal dissolves, softens or weakens one or more hydrated cement phases which in turn increases permeability of the hardened refractory shape. This in turn severely limits the service life of said shape.

The use of magnesium oxide for the room temperature hardening of phenolic resole resins is well known and disclosed in references such as: U.S. Pat. No. 2,869,191 of Jan. 20, 1959; U.S. Pat. No. 2,869,194 of Jan. 20, 1959; U.S. Pat. No. 2,869,196 of Jan. 20, 1959; and U.S. Pat. No. 2,913,787 of Nov. 24, 1959 which were issued to R. H. Cooper as well as U.S. Pat. No. 2,424,787 which issued to W. H. Adams on July 29, 1947.

Japanese Kokkai Tokyo Koho JP 60/90251 of May 21, 1985 to Kyushu Refractories Co. Ltd. discloses the room temperature hardening of resole with magnesium oxide and ethylene carbonate.

U.S. Pat. No. 4,794,051 of Dec. 27, 1988 to M. K. Gupta broadly discloses molding compositions comprising : (a) a phenolic resole resin; (b) a hardening agent of alkaline metal oxides or hydroxides e.g. magnesium oxide, and silanes; (c) a filler; (d) a lactone; and (e) a fiber reinforcement. However, the Gupta compositions do not harden at room temperature within 24 hours and possess still further shortcomings.

Phenolic resole resins such as those used in this invention have been used commercially for the manufacture of refractory bricks; however, such use did not involve hardening with magnesium hardening agents or magnesium hardening agents together with an ester hardening agent nor room temperature hardening as in the present invention.

U.S. Pat. No. 4,939,188 of Jul. 3, 1990 to A. H. Gerber discloses the use of lithium ion as an alkalizing agent for the room temperature cure of resoles for use as refractories and in a list of optional modifiers, magnesium oxide is mentioned.

European Patent Application, Publication No. 0094165 of 16-11-83 to Lemon et al. discloses the use of phenolic resole resins which are hardened with ester functional hardening agents in the production of paper filters. In the recitation of alkaline agents for condensation of the phenol and formaldehyde in the preparation of the resin, magnesium oxide is mentioned. This reference goes on to state that mixtures of alkalis can be used especially where one is used as a condensation catalyst and another to provide the remaining alkalinity to achieve the desired alkali to phenol molar ratio. However, sodium, potassium and lithium hydroxides are preferred because they give resin solutions in solvents such as water and lower alcohols which are more stable. U.S. Re 32,720 of Jul. 26, 1988 and U.S. Re 32,812 of Dec. 27, 1988 to Lemon et al. disclose room temperature hardening of alkaline phenolic resole resins with ester functional hardening agents for preparation of foundry molds and cores.

U.S. Pat. No. 4,831,067 of May 16, 1989 to Lemon et al. discloses hardening of a friction filler and alkaline phenolic resole resin with an ester functional hardening agent. Alkalis recited as suitable are sodium hydroxide or potassium hydroxide or a mixture of these with alkaline earth oxides such as magnesium oxide, etc.

European Patent Application, Publication No. 0202004 which was published on Nov. 11, 1986 and assigned to Foseco International Limited discloses production of refractory shapes by the use of esters to harden phenolic resole resins.

The above references and other prior art, suffer from one or more shortcomings in relation to the methods and compositions of the present invention. Among such shortcomings there can be mentioned: lack of adequate fluid mix consistency; lack of mix working life; lack of room temperature hardening capability within 24 hours; lack of sufficient mechanical strength after the room temperature hardening, thermal cure or carbonization; the use of high alkali metal content in the resin which acts as a fluxing agent when the refractory shape is fired at high temperature; the lack of high carbon producing binder; and the use of calcium based alkalis or combinations thereof with magnesium oxide which react quickly and reduce working time at room temperature.

SUMMARY OF THE INVENTION

Accordingly, the present invention provides methods and binder compositions of phenolic resole resins having a free phenol content of about 15% to 25%, a chemically bound aldehyde to phenol molar ratio of not more than about 1.5 moles of aldehyde per mole of phenol, and lightburned magnesium oxide having a surface area of at least 20 square meters per gram, optionally with ester functional hardening agents, which can be used with refractory aggregates to produce raw batch compositions.

It is an object of this invention to provide raw batch compositions which exhibit good flow and compaction upon vibration, mix working times of at least 15 minutes and preferably at least 30 minutes and which harden as shaped articles in 24 hours or less on standing at 23° C. with tensile strengths of at least 75 psi as measured at 25° C., are non-bloating in that they do not expand and loose strength at a temperature of 80 C after the above mentioned 24 hour hardening; and have resin viscosities of about 250 to 1,000 cps at 25° C. when the resin solids are at about 70% by weight of the resin.

In one aspect of the invention, a raw batch composition for use in making a shaped article, e,g. a refractory article, is provided. The raw batch composition comprises a mixture of: (a) an aggregate material; (b) a room temperature hardenable phenolic resole resin binder solution wherein the resole is present in sufficient quantity to bond the aggregate into a desired shape at room temperature with or without the use of an ester functional hardening agent; (c) 15% to 50%, by weight of the resin, of lightburned magnesium oxide having a surface area of from about 20 to 200 square meters per gram; and (d) optionally an ester functional hardening agent and conventional additives used in refractory compositions.

In another aspect, the invention involves a method for making a raw batch composition which comprises mixing the ingredients used in the above mentioned raw batch composition. Further, the mixture can be formed into a desired shaped article, and the article can be allowed to stand to develop the requisite room temperature strength.

Still further aspects of the invention involve thermal curing of the shaped article and heating at a still higher temperature to carbonize the resin binder to form a refractory body.

DETAILED DESCRIPTION OF THE INVENTION

Magnesium Oxide Hardening Agent

The term "raw batch composition" refers to a composition of this invention which comprises an aggregate, hardenable phenolic resole resin, magnesium oxide hardener, and optionally an ester functional hardening agent and additives used in refractory compositions. The raw batch compositions of this invention harden within 24 hours on standing at 23° C. to a tensile strength of at least 75 psi. Although such hardening can also be referred to as "curing" we prefer the term "hardening" since the composition is further strengthened upon thermal curing such as at temperatures of at least 77° C. and generally at temperatures of at least 100° C. The composition can then be carbonized by heating at temperatures above 800° C. and preferably carbonizing is conducted at temperatures of at least 1,000° C.

By the term "room temperature" hardening we mean hardening of the raw batch compositions at temperatures of about 18.C to 32° C and particularly about 21° C. to 30° C. However, the compositions can be advantageously hardened at even higher ambient temperatures such that of 43° C.

The magnesium hardening agent used in this invention is a lightburned magnesium oxide having a surface area of at least about 20 square meters per gram, e.g., 20 to 200 or more square meters per gram. The use of magnesia having smaller surface areas react too slowly for use in this invention. Magnesium hydroxide which is also known as a hardening agent for phenolic resole resins is also too slow a hardening agent in the compositions of this invention and the hardened compositions lack the strength of the magnesium oxide hardener used in this invention. When the mixture includes both magnesia and ester hardeners, it is preferred that the surface area of the magnesia be from about 20 to about 125 square meters per gram; whereas in the absence of ester, it is preferred that the surface area be at least 40 square meters per gram.

The use of calcium based materials as hardening agents, such as lime, calcium hydroxide and calcined dolomite have also been described in the prior art as hardening agents for resoles but they reduce the working time for the raw batch composition e.g. in filling out molds by vibrating the mold to form a shaped cast article. It is desirable to have a working time of at least 15 minutes and preferably at least 30 minutes for the compositions of this invention while the composition is eventually hardened to at least a 75 psi tensile strength and preferably at least 100 psi tensile, as measured at 25° C., within 24 hours on standing at 23° C.

By the term "working time" we mean the time period after thoroughly admixing the raw batch composition during which the composition has sufficient flow and plasticity so that articles can be formed, e.g. even for making dog bone tensile specimens for testing. A more objective definition of working time is that of a raw batch composition having an initial Percent Flow (as hereinafter defined) of 40% which does not decrease to less than 30% in 15 minutes and preferably in 30 minutes at 23° C.

Reactivity of magnesium oxide, i.e. the time it takes to harden a phenolic resole resin, depends on the method for manufacturing the magnesium oxide and it's surface area. Lightburned magnesium oxide has a surface area of from about 10 to 200 or more square meters per gram. Hardburned magnesium oxide has a surface area of about one square meter per gram; whereas deadburned magnesium oxide has a surface area of less than one square meter per gram.

Magnesium oxide which is conventionally used as a refractory aggregate with phenolic resole resins is the deadburned magnesia also referred to as periclase or magnesia aggregate. Neither hardburned nor deadburned magnesia are practicable room temperature hardening agents because they are too slow in hardening the phenolic. Magnesia products having different surface areas can be obtained from various sources, including the Martin Marietta Magnesia Specialties Company under the designator of Mag Chem Magnesium Oxide Products. Illustratively, Mag Chem 30 has a surface area of about 25 square meters per gram. Mag Chem 50 has a surface area of about 65 square meters per gram, whereas Mag Chem 200D has a surface area of about 170 square meters per gram.

The quantity of the magnesium hardener used in this invention can vary over a broad range such as that of from about 15% to 45% based on the weight of the phenolic resole resin. Preferably about 15% to 35% of the magnesia hardener based on the weight of resin is used when the composition also contains an ester functional hardening agent and about 15% to 45% of the magnesia hardener, based on the weight of the resin, is used when the composition does not contain an ester functional hardening agent. The exact amount will depend on many factors within the parameters of having at 23° C. (a) at least 15 and preferably at least 30 minutes of working time for the composition and (b) the 24 hour hardening time on standing to a tensile strength of at least 75 psi. Illustratively, the higher the free phenol content of the resin, the more difficult it is to harden the resin. To compensate for the slower hardening time of the resin, magnesia of a greater surface area can be used or the quantity of the magnesia can be increased, or an ester functional hardening agent can be added, or the specific ester can be replaced with a more active ester or a greater quantity of said ester, or the temperature can be increased, etc. Thus, the relationship of the various ingredients is interrelated.

The Ester Hardening Agent

The ester functional hardening agent accelerates the hardening of the resole when used with the magnesium hardening agent and improves the tensile and flexural strength of the shaped article upon room or ambient temperature hardening and also on subsequent thermal curing although strength is lost after carbonizing. Also, the ester initially reduces viscosity of the composition and improves flowability. Mixtures of phenolic resole resins and an ester functional hardening agent in the absence of magnesia hardener or other alkali will not harden at 23° C. within several days or longer. The ester functionality for hardening of the phenolic resole resin can be provided by lactones, cyclic organic carbonates, and carboxylic acid esters or mixtures thereof.

Generally, low molecular weight lactones are suitable as the ester functional hardening agent, such as beta- or gamma-butyrolactone, gamma-valerolactone, caprolactone, beta-propiolactone, beta-butyrolactone, beta-isobutyrolactone, beta-isopentyllactone, gamma-isopentyllactone, and delta-pentyllactone. Examples of suitable cyclic organic carbonates include, but are not limited to: propylene carbonate, ethylene carbonate, ethylene glycol carbonate, 1,2-butanediol carbonate, 1,3-butanediol carbonate, 1,2-pentanediol carbonate, and 1,3-pentanediol carbonate.

The carboxylic acid esters which can be used in this invention include phenolic esters and aliphatic esters.

The aliphatic esters are preferably those of short or medium chain length, e.g., about 1 to 10 carbon mono- or polyhydric, saturated or unsaturated alcohols with short or medium chain length, e.g. about 1 to 10 carbon aliphatic, saturated or unsaturated carboxylic acids which can be mono- or polycarboxylic. The preferred aliphatic esters are those of alkyl, mono-, di-, or trihydric alcohols with alkyl, mono-, or diunsaturated acids which can be mono-, di-, or tricarboxylic.

Specific carboxylic acid esters include but are not limited to: D-butyl formate; ethylene glycol diformate; 1,4-butanediol diformate; methyl and ethyl lactates; ethylene glycol diacetate; triacetin (glycerol triacetate); diethyl fumarate; dimethyl glutarate; dimethyl adipate; and the like. Also suitable are: cyanoacetates derived from 1 to 5 carbon atom aliphatic alcohols; formates and acetates of benzyl alcohol, alpha, alphadihydroxyxylenols, phenol, alkyl substituted phenols, dihydroxybenzenes, bisphenol A, bisphenol F, and low molecular weight resoles. At times, it is advantageous to use mixtures of the ester functional hardening agents.

Gaseous esters, such as methyl and ethyl formates, can be used as ester functional hardening agents. When gaseous esters are used as hardening agents, the ester is generally not mixed with the resin binder and aggregate but rather is supplied as a gas to the shaped article as is well known in the art.

The ester functional hardening agent is present in an amount sufficient to increase the tensile and compressive strength of the room or ambient temperature hardened composition while maintaining the 23 C working time and 24 hour hardening and tensile strength, all as mentioned hereinbefore. The addition of ester increases the rate of hardening of the phenolic resole resin. The quantity of ester will generally vary from that of about 5% to 40% by weight of the phenolic resole resin and preferably from about 10% to 25% by weight of the resin. As with the magnesium hardening agent, the exact quantity will depend on a number of factors such as: the particular ester used since some esters are more active than others; the amount and specific magnesium hardener used; the amount of free phenol in the resin; the molecular weight of the resin; the temperature at which the composition is used or stored; and the desired results.

The Phenolic Resole Resin

The phenolic resole resins used in this invention can be phenolformaldehyde resole resins or those wherein phenol is partially or completely substituted by one or more phenolic compounds such as cresol, resorcinol, 3,5-xylenol, bisphenol-A, or other substituted phenols and the aldehyde portion can be partially replaced by acetaldehyde, furaldehyde, or benzaldehyde. The preferred phenolic resole resin is the condensation product of phenol and formaldehyde. Resole resins are thermosetting, i.e., they form an infusible three-dimensional polymer upon application of heat and are produced by the reaction of a phenol and a phenol-reactive aldehyde typically in the presence of an alkali or alkaline earth metal compound as condensing catalyst.

The phenolic resole resins used in this invention contain from about 15% to 25%, based on the weight of resin, of free phenol and preferably from about 15% to 20%, by weight of the resin, of free phenol. The use of such relatively large quantities of free phenol contributes to the following advantageous properties of the resins in the manufacture of refractories: (a) low resin viscosities; (b) better resin stability on storage; (c) improved wettability of the resin toward the aggregate as well as better bonding of the aggregate; and (d) higher quantities of carbon on carbonization for bonding the refractory shape.

The phenolic resole resin or simply "resin" prior to hardening is a solution of polymer, monomers, and solvents. In this regard, free phenol monomer in the resin also assists in solubilizing the polymer. The quantity of free phenol in the resin is determined by gas chromatography. The quantity of solids are determined after evaporation of volatiles in a 135° C. oven.

Preferred phenolic resole resins used in this invention have less than about 1% and preferably not more than 0.5% by weight of water soluble sodium or potassium. Typically, phenolic resole resins are produced by reacting phenol and formaldehyde in a molar ratio (phenol: formaldehyde) within the range of from about 1:1 to 1:3. However, the molar ratio of phenol(P) to formaldehyde(F) which is combined in the resins of this invention range from about one mole of a phenol for each 1 to about 1.5 moles of the aldehyde and particularly a range of one mole of the phenol to about 1 to 1.3 moles of the aldehyde. The reason for this is that higher ratios of aldehyde to phenol do not provide the low viscosities, low molecular weights, and other desirable properties of the resins of this invention. In this regard a distinction needs to be made between the molar ratios of the phenolic compound and the aldehyde charged to the reactor and the molar ratio of these reactants which are bound or chemically combined in the resin. Thus the charge of reactants have a molar ratio of the phenol which is higher than that bound in the resin since a portion of the phenol does not react and remains free in the resin solution. Such reaction conditions are conventional and provide for reaction of substantially all of the aldehyde but not all of the phenolic. Generally such reaction conditions involve lower temperatures and shorter reaction times. In order to obtain the large quantity of free phenol, low viscosity, high solids, and other desirable properties of the resins used in this invention the mole ratio of the aldehyde to phenolic reactant charged to the reactor will be from about 0.9 to about 1.5 moles of the aldehyde per mole of the phenol and preferably from about 1.0 to 1.3 moles of the aldehyde per mole of phenol.

The pH of the phenolic resole resin used in this invention will vary from about 4.5 to 9 with a pH of about 5 to 9 and particularly about 5 to 8.5 being preferred. Free phenol will typically be 15% to about 25% by weight of the resin with preferred levels being 15% to 20%. The molecular weight of the resin will vary from about 200 to 600 weight average molecular weight with about 250 to 500 being preferred. All other things being equal, higher molecular weights and lower free-phenol will provide shorter gel or hardening time and increase strength development. The weight average molecular wight (Mw) is measured using gel permeation chromatography and phenolic compounds and polystyrene standards. The sample for molecular weight to be measured is prepared as follows: the resin sample is dissolved in tetrahydrofuran and slightly acidified with 1 N hydrochloric or sulfuric acid and dried over anhydrous sodium sulfate. The salts which result are removed by filtration and the supernatant liquid run through a gel permeation chromatograph. The effect of free phenol in the resin is generally excluded for the molecular weight determinations.

The resin solids in the resole resin can vary over a broad range, such as that of about 40% to 80% by weight of the phenolic resole resin. Preferably, the resin solids vary from about 55 to 75% by weight of the phenolic resole resin. The viscosity of the phenolic resole resin will vary from about 150 to 1,500 cps at 25° C. Preferably, the viscosity varies from about 200 to 700 cps at 25° C. The viscosity measurements herein are given in centipoises (cps) as measured by a Brookfield RVF viscometer at 25° C. or by Gardner-Holt viscosities at 25° C. The Gardner-Holt viscosities which are in centistokes are multiplied by the specific gravity (generally 1.2) to give the cps reading.

The quantity of resin mixed with the aggregate is a quantity sufficient to bind the aggregate on hardening of the resin. Such quantity can vary over a wide range such as that from about 3% to 15% by weight of the resin based on the weight of aggregate and particularly from about 5% to 15% of resin based on the weight of aggregate. Within this wide range the quantity of resin will also depend on the specific type of use for the composition.

The resin contains water or water together with an organic solvent. The resin will contain at least 5% and preferably at least 10% or 15% of water. Water contents for the resins used in this invention will vary from about 5% to 40% by weight of the resin and preferably from about 10% to 35% The water can be part of the resin as manufactured or additional water can be added to the resin. With the resins used in this invention it is advantageous to add from about 10% to 35% of water to the resin. This is in addition to the water present in the resin analysis given herein. Thus, in the case of Resin C herein, the addition of 33% of water acts as an activator in that it speeds up the reaction. Also, less resin is needed as well as less ester, when ester is used. The additional water gives better compaction and better flow. The resin with such added water will gel faster than the more concentrated resin. This is surprising since generally the more concentrated and viscous resin is expected to gel first. Solvents in addition to water can be selected from alcohols of one to five carbon atoms, diacetone alcohol, glycols of 2 to 6 carbon atoms, mono- and di-methyl or butyl ethers of glycols, low molecular weight (200-600) polyethylene glycols and methyl ethers thereof, phenolics of 6 to 15 carbons, phenoxyethanol, aprotic solvents, e.g., N,N-dimethylformamide, N.N-dimethylacetamide, 2-pyrrolidinone, N-methyl-2-pyrrolidinone, dimethyl sulfoxide, tetramethylene sulfone, hexamethylphosphoramide, tetramethyl urea, methyl ethyl ketone, methyl isobutyl ketone, cyclic ethers such as tetrahydrofuran, m-dioxolane, and the like.

Organfunctional silane adhesion promoters, such as gamma-aminopropyl triethoxysilane or 3-glycidoxypropyltrimethoxy silane which can be used in amounts of up to about 0.05% to 1% by weight, based on the weight of resin, are recommended for use when compositions of this invention include siliceous aggregates such as silica sands, crushed rock and silicates, and alumina based aggregates.

Applications

The binder compositions comprise the phenolic resole resin, lightburned magnesia and optionally ester and additives whereas the raw batch compositions further include the aggregate. These are prepared by mixing the ingredients by any means known in the art, i.e., using any industrial mixer such as an Eirich mixer a Simpson mixer, a Muller mixer, and the like. In the formulation of the compositions of this invention it is essential to achieve a uniform and thorough dispersion or mixture of all the ingredients. The magnesium hardener, generally in admixture with the aggregate, is one of the last ingredients to contact the resin in preparation of the mixtures.

The raw batch composition which results from the mixing step may be molded by any technique known in the art and subjected to pressure or simply permitted to fill a form to produce a desired shape. For example, the raw batch composition may be subjected to compression, vibration, isostatic pressing, transfer molding, extrusion or injection molding at desired temperatures and pressures.

Following shaping, a low density shape may be subjected to gassing with a gaseous or vaporous ester functional hardening agent and/or a series of heat treatment techniques as known in the art. When gassing the shape with an ester functional hardening agent, it is often not necessary to add a liquid ester functional hardening agent into the binder composition. For the compositions of this invention the applicants have found that it is preferable, after the 24 hour room temperature hardening, to start the heating cycle at a temperature below 100 C such as 80.C in order to obtain stronger shaped articles. A typical heat treatment involves a continual increase in temperature up to about 120° C. to 205° C. to effect thermal cure of the resin binder and evaporate off water and organic solvent. Further heat treatment up to 800° to 1,000° C. promotes carbonization of the resin binder and pyrolyses or sinters the shape.

Accordingly, shaped articles which may be prepared include, for example, kiln furniture, hot tops, tundish liners, insulation, ceramic materials, and the like.

In the case of refractories such as brick, the refractory composition is generally pressed into the desired shape and then thermally cured and finally carbonized. However in this invention the composition is generally permitted to harden at room or ambient temperatures for 24 hours or more in order to attain a tensile strength of at least 300 psi at 25° C. and then shipped to their place of use for thermal curing and eventually carbonizing. At times, there is a delay after preparing the brick composition and before pressing it into the desired shapes. Such delay can be of a few minutes duration or it can last over a period of many hours. During such delay, the resin will normally increase in viscosity which leads to a drier composition which also has decreased density. Subsequent pressing of such binder into a shaped article such as brick with the subsequent thermal curing produces articles having diminished strength which at times needs to be compensated by increased press cycles. The quantity of phenolic resole resin based on the weight of aggregate for refractory brick will generally vary from about 3% to 5%. With such low quantities of the resin, bloating which can be a problem on thermally curing compositions of this invention containing more than about 5% resin before adequate room or ambient temperature hardening is not a problem.

In some refractory applications, prefabricated forms, other than brick-like shapes, are required, These "monolithic refractories" are cast by placing a liquid flowable binder-aggregate system into a mold and then filling out the mold by using vibration. Once the binder-aggregate system (raw batch composition) room or ambient temperature hardens to a tensile strength of at least 75 and preferably 100 psi at 25° C., the mold is stripped away so that the shape can be thermally cured or otherwise readied for use, either before or after transporting the monolithic refractory to its place of use. The compositions of this invention provide increased working time for filling out the mold and increased tensile strengths on room or ambient temperature hardening in 24 hours sufficient to thermally cure or transport the shape. Permitting the composition to room or ambient temperature harden to a tensile of at least 75 psi and preferably at least 100 psi is important for preventing bloating on the subsequent thermal curing of the castable composition which will generally contain at least 5% and preferably at least 7% of the resin.

Briefly, in making the shaped monolithic refractory articles, a raw batch composition of this invention is placed in a mold and vibrated. The quantity of resin based on aggregate is at least 5% and preferably at least 7% by weight. Vibration causes the composition to take the shape of the mold. Within 24 hours, at ambient temperature, when the composition has hardened to a tensile strength of at least 75 psi and preferably at least 100 psi, as measured at 25° C., the cast article is separated from the mold. The shaped article can then be thermally cured. Thermal curing of the cast article before it attains the desired tensile strength often causes bloating of the article and consequent damage. After thermal curing the article is carbonized.

In order that those skilled in the art may more fully understand the invention presented herein, the following examples, tables and procedures are set forth. In the examples, as well as elsewhere in this application all percentages are by weight and all tensile strengths are measured at 25° C., unless otherwise stated.

PROCEDURES USED IN THE EXAMPLES AND TABLES AND PROPERTIES OF THE RESINS

A. Procedure for Gel Determination

A screw cap glass vial (28×95mm) is charged with: the resin; and other additives or ester hardener as indicated in the example or table involved. The solution is mixed well prior to addition of the lightburned magnesia. The mixture is thoroughly mixed for one minute using a S/P Vortex Mixer of American Scientific Products at a setting of 9. Five grams(g) of this mixture is immediately transferred to a glass test tube (18×155mm). A glass rod with a magnetized head fitting is introduced into the mixture and fitted to a Sunshine Gel Time Meter which is then turned on. The tube is immersed in a 25° C. water bath throughout the test. The time of gelation is signified when the magnetized head stops turning and also by the sounding of an audible signal.

B. Specimen Preparation and Testing Procedure for Tensile Strength and Percent Flow A 5 quart Hobart Industrial Mixer is charged with the following components (which are homogeneously mixed):

190g 5×8 refractory grade MgO
190g 8×18 MgO refractory grade aggregate
190g 18×40 Mgo refractory grade aggregate
190g −40 MgO refractory aggregate
240g Pulverized MgO refractory grade aggregate
20g Aluminum powder, 120 atomized from Reynolds Aluminum Company
Xg Liqhtburned MgO hardener and additive (if any) as indicated in the table or example.

The numbers following the various weights for the aggregates given above represent particle size, e.g., an 8X18 aggregate is one which passes through a No. 8 U.S. Sieve series screen but is retained on a No. 18. The pulverized aggregate passes through a No. 200 U.S. Sieve series screen.

All of the above aggregates, except the pulverized grade, are spherical. Resin and ester (if any) are blended in the proper ratio and mixed well. Twelve to 14% (as desired) of this solution based on the MgO aggregate weight is charged to the magnesium oxide aggregate and liqhtburned magnesium oxide hardener. The mix is then agitated at the No. 1 setting for 4 minutes or more until a homogeneous mix is apparent. A 3 inch diameter glass mortar is filled with mix, leveled and then inverted so as to discharge the hemisphere of mix onto a Syntron Model No. VP51D1 Syntron vibrating table. The mix is vibrated on highest setting for 5 seconds and the percent increase in the diameter of the mix is then taken as the Percent Flow.

The mix is then charged to a gang of dogbone forms pre-coated with lubricant and secured together by electrical tape. Filling of dogbones takes place on the vibration table with the setting on one-half. Once filled, the forms are smoothed and then placed at 25° C. constant temperature for 24 hours. Room temperature strengths are determined and remaining specimens cured at the desired heating cycle. Coking strengths are determined on thermally cured pieces by placing specimens in a muffle furnace, turning all settings to "high", and taking the temperature up to 1,000° C. over 3-4 hours and holding for one hour. At the end of the hold period, the furnace is turned off and allowed to cool naturally. The entire coking procedure takes place under an atmosphere of nitrogen (purity of <10ppm oxygen) with a nitrogen usage of 30 cubic feet per hour. All tensiles are determined on a Tinius-Olsen Locap Testing Machine using a platform descent speed of 0.15 inches /minute.

C. Procedure For Preparation of Plug Mixes

The procedure for preparing the "plug mixes" such as are used in Examples 6, 7 and 8 herein was as follows. A 250 ml plastic beaker was charged with: (a) aggregate composed of 36 grams(g) refractory grade magnesia which passes through a 20 mesh screen from a batch of magnesia having particles passing through a 14 mesh screen but retained on a 48 mesh screen; and (b) 9g of refractory grade magnesia fines which pass through a 200 mesh screen. To the aggregate there was then added the quantity of alkali shown in the example or table involved as well as 5 g of graphite and 1 g of atomized aluminum powder. These were then mixed well with a steel spatula. This mixture is referred to as the aggregate mixture. Seven grams of the appropriate resin solution and the designated amount of ester hardener, if used, together with diluent for the resin, if diluent is used, as shown in the example or table involved, is also mixed together and 7 g of this solution is added to the aggregate mixture and further mixed for 2 minutes to form the plug mix. Thus, the quantity of resin, based on the weight of magnesia aggregate is about 15.5%, when diluent and ester are not used. The percentage of resin based on aggregate is decreased in accordance with the amount of ester and diluent used. The specimens were qualitatively tested for hardness on standing at room temperature (about 23° C.) by probing with a wood applicator stick or a nail over about an 18 or 24 hour period. The wettability and workability of the mix was recorded. The plug mix was then charged to a plastic cylinder 1 and ⅛ inches wide and 2 inches high which was then compressed and rolled to give a well compacted mix which thoroughly wet the inner surface of the plastic container.

D. Properties of Phenolic Resole Resin C

Phenolic resole Resin C is prepared by reacting phenol and formaldehyde in an initial molar ratio of one mole of phenol for each 1.25 moles of formaldehyde in the presence of sodium hydroxide as catalyst. The resin has the following properties: solids 68.6%; free phenol 15.7%; water 11.7%; pH 8.9; weight average molecular weight of 290; and a viscosity of about 250 cps at 25° C.

E. Properties of Phenolic Resole Resin Z

Typical properties of Resin Z are as follows: pH of 8; solids content of 65%; water content of 7.5%; free phenol content of 23.5%; number average molecular weight of 114; weight average molecular weight of 183; a viscosity at 25 C of about 375 centipoises (cps). The molar ratio of formaldehyde to phenol charged to the reactor was 0.93. The molecular weight of Resin Z, unlike that of the other resins mentioned herein, includes the phenol.

F. Properties of Phenolic Resole Resin D

Resin D is characterized as follows: F/P=1.5 resole; 71.5% solids; 12.8% water; 14.7% free phenol; weight average molecular weight of 495; and viscosity of 1024 centistokes at 25° C.

EXAMPLE 1

In this example, various tests were made with Resin Z to determine the effect on work time, percent flow, and tensiles after room temperature hardening, thermal curing and carbonization by use of lightburned magnesium oxide having a surface area of about 170 to 200 square meters per gram, namely, Mag Chem 200D which is manufactured by the Martin Marietta Magnesia Specialties Company. Four different mixes were prepared. Mix A was composed of Resin Z and 28.8% of Mag Chem 200D, based on the weight of the resin. Mix B was composed of Resin Z with 28.8%, based on the weight of resin, of Mag Chem 200D and 15%, based on the weight of resin, of gammabutyrolactone. Mix C was composed of Resin Z with ethylene glycol diformate at a concentration of 15% based on the weight of resin, with the lightburned magnesia at a concentration of 28.8%, based on the weight of resin (B.O.R.), and having a surface area of 65 square meters per gram. Mix D contained neither ester nor magnesia hardener. The tensile strengths were determined after: (a) 24 hours of hardening at room temperature (RT) to a tensile strength of at least 75 psi; (b) an oven cure which had a cure cycle of 2 hours at 110 centigrade (C) after the room temperature hardening; and (c) carbonizing at 1,000° C. after going through the RT (room temperature) and oven cure cycles.

The results of this example are shown in Table 1. Among other things, it can be seen from Table 1 that: (a) the tensile strength after the RT hardening of Mix B which contained the ester was about twice as much as Mix A which did not contain ester; (b) the tensile of Mix A after the oven cure was less than half that of Mix B; and (c) the tensile strength after carbonizing was greater for Mix A than that for Mix B. In Mix C, the magnesia was of such low surface area, in relation to the resin, that the 24 hour tensile was very low. Mix D had no room temperature capability to harden and thus had no room temperature strength.

TABLE 1

| Mix | Work Time Min. | % Flow | Tensile, psi | | |
|-----|----------------|--------|--------------|---|---|
|     |                |        | 24 hr. RT | Oven Cure | 1000° C. |
| A | 20-30 | 40 | 270 | 520 | 125 |
| B | 20 | >40 | 600 | 810 | 50 |
| C | 30 | 40 | 35 | 1025 | 75 |
| D | >30 | 40 | * | ** | 105 |

*Too soft to measure
**In addition to the 2 hours oven cure at 110° C., it was further cured for 1 hour at 180° C.

EXAMPLE 2

This example shows gel times, in minutes, at 25° C. for compositions of Mag Chem 50, a lightburned magnesium oxide hardener having a surface area of 65 square meters per gram which is manufactured by Martin Marietta Magnesia Specialties Company, and various solvents, with gamma-butyrolactone as the ester hardening agent. Mixes 1,2, and 3 were composed of 8.0g of Resin C, 1.2g of gamma-butyrolactone, 1.33 g solvent and 1.6 g Mag Chem 50. Mix 4 had the same composition as the previous mixes except that it did not contain the magnesia hardener. The abbreviation in Table 2 of DPn3 is dipropylene glycol n-monobutyl ether whereas PGME is polyethylene glycol monomethyl ether having a molecular weight of 350. The results of this example are set forth in Table 2.

It can be seen from Table 2 that the use of 1.33g of water as the solvent gave faster gel times as compared to the Mixes where water made up only 50% of the added solvent and the remainder was made up of an organic solvent. Also, it can be seen that without the magnesia hardener, the composition of Mix 4 had not hardened in two weeks.

TABLE 2

Gel time of Resin C/gamma-Butyrolactone/Magnesia/and Certain Solvents

Mix:
8.0 g of Resin C
1.33 g solvent
1.2 g gamma-butyrolactone
1.6 g lightburned magnesia having a surface area of 65 square meters per gram.

| Mix | Solvent | Gel Time (Minutes) at 25° C. |
|---|---|---|
| 1 | water | 210 |
| 2 | 1:1 water/DPnB | 315 |
| 3 | 1:1 water/PGME | 275 |
| 4 | water | >2 weeks* |

*No magnesia was present

EXAMPLE 3

This example shows the effect of lightburned magnesium oxide having a surface area of 65 square meters per gram (Mag Chem 50 of the Martin Marietta Magnesia Specialties Company), various mixtures of the magnesium oxide and lime (CaO) and the use of an ester with the magnesium oxide on the gel times of phenolic resole Resin C at a temperature of 60° C. The results of this example are set forth in Table 3. Furthermore it was observed that Mixes 2 and 3 which contained the lime gave a mild exotherm upon the addition of the alkali and coalescing of the particles were observed. It can be seen from Table 3 that it took longer to gel Mixes 2 and 3 in comparison with Mix 1 which contained only the MgO (magnesia) as the alkali and it appears that the coalescence adversely affected the system. It can also be seen from Table 3 that Mix 4 which contained the ester in addition to the MgO gelled in 28 minutes whereas Mix 1 gelled in 54 minutes.

TABLE 3

Effect of Magnesia Hardener Alone or Together with Lime or gamma-Butyrolactone (Ester) on Gel Time of Resin C at 60° C.

Mix:
8 g Resin C
1.2 g gamma-butyrolactone (for Mix 4 only)
1.6 g alkali (MgO alone or mixture of MgO and lime)

| Mix | Alkali | Gel Time in Minutes |
|---|---|---|
| 1 | MgO | 54 |
| 2 | 2:1 MgO/CaO | 123 |
| 3 | 4:1 MgO/CaO | 94 |
| 4 | MgO + Ester | 28 |

EXAMPLE 4

This example was performed to show the effect of different molar ratios of formaldehyde(F) to phenol(P) charged to a reactor on the quantity of free phenol and molecular weight of the resin under substantially the same reaction conditions. Also, this example shows the effect of lightburned magnesium oxide hardener of different surface areas on the tensile strength of each sample. Some of the tests were run on the same batch of resin while others were on different batches. The quantity of the lightburned magnesium hardener was 20% based on the weight of resin. The tensile strengths were measured in the manner set forth in the following procedure for tensile strength determinations after the compositions were permitted to harden on standing for 24 hours at 23° C.

The results of this example are shown in Table 4 wherein: the designator "F/P" is the mole ratio of formaldehyde to phenol charged to the reactor; the designator "H" stands for the magnesium oxide hardener and the values in that column give the surface area of the different magnesia in square meters per gram; and the tensiles are given in psi at 25.C units after the sample stood for 24 hours at 23° C.

It can be seen from TABLE 4 that: the very low F/P mole ratio of 0.93 produced lower strengths as compared to the higher mole ratios; the higher F/P molar ratios charged to the reactor produced less free phenol; and for the same batches of resin, the higher surface area hardening agent produces the higher tensile.

TABLE 4

Effect of Different Mole Ratios of F/P Charged to Reactor and Effect of Magnesia Surface Area on Tensile Strengths

| F/P | Batch** | H | % Free Phenol | M.W.* | Tensile |
|---|---|---|---|---|---|
| 0.93 | A | 170–200 | 23.6 | 183 | 30 |
| 0.93 | B | 170–200 | 25.2 | 153 | 25 |
| 1.10 | C | 100 | 21.1 | 153 | 80 |
| 1.10 | C | 170–200 | 21.1 | 153 | 135 |
| 1.10 | D | 100 | 19.2 | 169 | 170 |
| 1.10 | D | 100 | 19.2 | 169 | 125 |
| 1.10 | D | 170–200 | 19.2 | 169 | 305 |
| 1.25 | F | 65 | 14.9 | 204 | 220 |

*The molecular weight of the resin included the effect of free phenol.
**Batches A and B are equivalent to Resin Z and batch F is equivalent to resin C.

EXAMPLE 5

This example was performed to show the effect of various ester functional hardening agents, surface area of lightburned magnesium oxide, in square meters per gram, on the working time and Shore D hardness of the room temperature hardened resins. The quantity of ester used was 15% based on the weight of resin and the quantity of lightburned magnesium oxide was 20% based on the weight of resin. It can be seen from Table 5 that in a few cases, with the faster esters such as propylene carbonate, phenyl acetate, and triacetin together with the higher surface area magnesia that the desired working time of at least 15 minutes was not attained. Also with Resin D which has a F/P mole ratio of 1.5, the mole ratio is getting to the high side with the specific esters and magnesia surface area used so that the mixes do not provide the desired minimum working time of 15 minutes. The butyrolactone used was gamma-butyrolactone

TABLE 5

EFFECT OF ESTER & MAGNESIA SURFACE AREA ON HARDNESS & WORK TIME OF PLUG MIXES

| Mix | Resin | Ester | MgO Surface Area ($m^2/g$) | Approx Work Time Min. | Shore D Hardness 6 hrs | Shore D Hardness 24 hrs |
|---|---|---|---|---|---|---|
| 1 | C | Butyrolactone | 50 | 25 | 40 | 75–80 |
| 2 | " | " | 100 | 20 | 50 | " |
| 3 | " | Triacetin | 50 | 25 | 35 | " |
| 4 | " | " | 150 | 10 | 70 | " |
| 5 | " | Isobutyl formate | 50 | 25 | 40 | " |
| 6 | " | " | 100 | 20 | 45 | " |
| 7 | " | Propylene carbonate | 50 | 25 | 35 | " |
| 8 | " | " | 150 | 10 | 45 | " |
| 9 | " | Diethyl oxalate | 50 | 25 | 30 | " |
| 10 | " | Phenyl acetate | 50 | 25 | 40 | " |
| 11 | " | " | 150 | 10 | 55 | " |
| 12 | " | 1,4-butanediol diformate | 35 | 15 | 65 | " |
| 13 | D | Butyrolactone | 50 | <15 | 70 | 80 |
| 14 | " | Isobutyl formate | 100 | <15 | " | " |
| 15 | " | Triacetin | 150 | " | " | " |
| 16 | C | Butyrolactone | 50 | 20 | 50 | " |

EXAMPLE 6

This example was performed to show the effect on workability and relative hardness of compositions with and without ester functional hardening agents and alkaline substances on Resin Z mixed with dead burned (refractory grade) magnesia aggregate, graphite and atomized aluminum powder additives. The compositions used herein are referred to as "plug mixes".

The results of Example 6 are shown in Table 6. In Table 6, under the heading of "Hardener" the letter "B" stands for gamma-butyrolactone; the letter "N" stand for none (i.e. no ester hardener was used); and the letter "I" stand for isobutyl formate. The quantity of the ester hardener, when used, was 15% by weight, based on the weight of resin. As set forth hereinabove, the quantity of resin based on aggregate, when neither ester nor diluent is used is about 15.5%. In Table 6, under the heading of "Alkali (and %)" the numbers in parenthesis are the percent of alkali, based on the weight of aggregate in the plug mix. Under this same heading in Table 6, the following designators represent the following alkalis: MV-200 and MR-200 are hydrated lime from the Mississippi Lime Co. ; calcined dolomite is as stated; MG 50 is MagChem 50, a lightburned magnesium oxide of the Martin Marietta Magnesia Specialties Company having a surface area of about 65 square meters per gram; MG 200D is MagChem 200D, a lightburned magnesium oxide of the Martin Marietta Magnesia Specialties Co. having a surface area of about 170 to 200 square meter per gram; and MH-30 is magnesium hydroxide having a surface area of 40 square meters per gram. In Mix 15 water (15% B.O.R.) was added to Resin Z. In Table 6, under the heading of "Mix Workability (Approx. Min)" there is set forth the condition of the mixture and its working time, e.g. "v. dry (none)" means that the mixture was dry and had a working time of less than 10 minutes; "v. wet (>20)" means that the mixture was very wet and had a working time of greater than 20 minutes. Under the heading of "Hardness" in Table 6, there is set forth the qualitative hardness as determined with the wood applicator stick or nail on a scale of 1 to 8 with 1 being the hardest and 8 being the softest after an 18 to 24 hour period on standing at room temperature (23° C.). A hardness value of 1 to 4 embraces those compositions which develop a tensile strength of at least 75 psi as measured at 25° C.

The results of this example are shown in Table 6. The following observations can be made from Table 6. Mixes 1–4, 11, 12 demonstrate the problem of inadequate working time when a calcium based alkali is used. Mix 13 without ester hardener and a low level ( 1% on aggregate which is equivalent to about 10% based on resin weight) of calcium hydroxide (MV-200) gave good working time but very poor relative hardness.

Mixes 8,9 wherein 8.5 % KOH ( on aggregate) is the alkali equivalent of 3% MgO provide very good workability but very poor hardness. This can be attributed to the extremely effective solubilizing effect of KOH as compared to MgO. In mix 9 the KOH is not sufficiently consumed during ester hardening and this can solubilize resin. This is not even a possibility for Mix 8 without ester.

Other mixes, i.e. wherein MgO is used, show the predicted effects; higher surface area or higher concentration provide decreased working time and increased hardness. Presence of a high activity ester enhances hardness. Magnesium hydroxide (MH-30 of Mix 10 at 4.5% is approximately equal to 3% MgO in equivalents) is an ineffective hardener in the systems of this invention. It should also be noted that Mix 15 with the 15% of added water, based on resin weight, enhanced reactivity and thus Mix 15 is harder than Mix 7. In Table 6, under the heading of "Mix Workability", the abbreviation "v." stands for "very" and the abbreviation "g." stands for "good".

TABLE 6

Effect of Ester Functional Hardening Agent and Alkali on Hardening and Working Time of Plug Mixes with Resin Z

| Mix | Hardener | Alkali (and %) | Mix Workability (Approx. Min.) | Hardness |
|---|---|---|---|---|
| 1 | B | MV-200 (3) | v. dry (none) | 1 |
| 2 | N | MV-200 (3) | v. dry (<10) | 1 |
| 3 | B | calcined dolomite (3) | dry (<10) | 4 |
| 4 | N | calcined dolomite (3) | dry (<10) | 3 |
| 5 | I | MG 50 (3) | v. wet (20) | 4 |
| 6 | N | MG 50 (3) | v. wet (20) | 5 |
| 7 | N | MG 200D (3) | v. wet (20) | 2 |
| 8 | N | KOH (8.5) | wet (>20) | 8 |
| 9 | B | KOH (8.5) | g. wetting (>20) | 7 |
| 10 | N | MH-30 (4.5) | v. wet (>20) | 7 |
| 11 | B | MV-200 (1) | dry (<5) | 6 |
| 12 | N | MV-200 (2) | v. dry (<15) | 4 |
| 13 | N | MV-200 (1) | wet (>20) | 7 |
| 14 | N | MR-200 (2) | v. dry (<10) | 4 |
| 15 | N | MG 200D (3) | v. wet (>20) | 1 |

EXAMPLE 7

This example was performed to show the effect on the relative hardness of plug mixes containing Resin Z and lightburned magnesium oxide of different surface areas and concentrations. The procedure and composition of the plug mixes as well as that for determining relative hardness is the same as that in Example 6. The results of this example are shown in Table 7 wherein it can be seen that increasing hardness accompanies increasing magnesia level and increased surface area.

In Table 7, trade names of different lightburned magnesia which was tested and its percent concentration, based on the weight of aggregate is set forth under the heading of "Magnesia (%)". The number in parenthesis following the trade name is the concentration of the magnesia. The trade names of MagChem 200D, MagChem 150, MagChem 100, and MagChem 50 are all of the Martin Marietta Magnesia Specialties Company. MagChem 200D has a surface area of about 170-200 square meters per gram. MagChem 150 has a surface area of about 150 square meters per gram. MagChem 100 has a surface area of about 100 square meters per gram. MagChem 50 has a surface area of about 65 square meters per gram. The trade names MG OX 98 HR and MG OX 98 PR are those of Premier Refractories & Chemicals, Inc. with the 98 HR designating lightburned magnesia having a surface area of about 65 square meters per gram and 98 PR designating lightburned magnesia having a surface area of about 100 square meters per gram. In the column in Table 7 under the heading of "Hardness", the different mixes are ranked by relative hardness as set forth in Example 6. Those mixes having a hardness of 1-4 would have tensiles of a least 75 psi as measured at 25° C. Mixes 13 and 15 were the only mixes which also contained an ester functional hardening agent, namely gamma-butyrolactone at a concentration of 15% based on the weight of resin. It can be seen from Table 7 that increases in the surface area or quantity of the lightburned magnesium oxide resulted in increased hardness. Also, incorporation of the ester functional hardening agent in Mix 15 gave equivalent hardness to that of Mix 14 even though Mix 14 contained a larger quantity of the magnesia hardener.

TABLE 7

| Mix | Magnesia (% on Aggregate) | Hardness |
| --- | --- | --- |
| 1 | MagChem 200D (2) | 5 |
| 2 | MagChem 200D (3) | 3 |
| 3 | MagChem 150 (3) | 3 |
| 4 | MagChem 150 (4) | 1 |
| 5 | MagChem 150 (5) | 1 |
| 6 | MagChem 100 (3) | 5 |
| 7 | MagChem 100 (4) | 4 |
| 8 | MagChem 100 (5) | 2 |
| 9 | MagChem 50 (3) | 7 |
| 10 | MagChem 50 (4) | 6 |
| 11 | MagChem 50 (5) | 5 |
| 12 | MG OX 98 HR (3) | 7 |
| 13* | MG OX 98 HR (2) | 8 |
| 14* | MG OX 98 PR (3) | 4 |
| 15* | MG OX 98 PR (2) | 4 |

*In Mixes 13 and 15 the mixes included 15% of gamma-butyrolactone, based on the weight of resin.

EXAMPLE 8

This example was performed to show the effect of magnesia surface area, concentration, ester curing agent and water diluent on the relative hardness of plug mixes. The plug mixes were prepared in the manner described hereinbefore and the hardness was also determined as described in Example 6. The resin used was Resin Z.

The results of this example are shown in Table 8. In Table 8, under the heading of "Hardener (% on Resin)", the concentration of the ester, when used, was 15% based on the weight of resin unless otherwise indicated. Additionally, Mixes 8-14 contained 4% of water as diluent, based on the weight of resin. Under the heading of "Magnesia (% on Aggregate)", the various trade named magnesia used in each mix are indicated. The trade named products have been described previously. The number in parenthesis next to the trade name is the percent of the magnesia based on the weight of aggregate. Under the heading of "Hardness", the numerical ratings were obtained the same way as in examples 6 and 7 with 1 being the hardest and 8 being the softest after 18 to 24 hours of testing. The mixes having a hardness of 1-4 are those with tensiles of at least 75 psi as measured at 25° C.

The following observations can be made from Table 8: (a) oxalate and cyclic carbonates are not as effective as gamma-butyrolactone in increasing hardness; (b) higher levels of MgO or increasing its surface area increases the hardness; (c) use of ester hardening agent, as in Mix 14, increases hardness relative to comparable Mixes 16 and 9 without ester; and (d) increasing ester hardening agent from 10% to 15% increased reactivity, thus, Mix 1 is harder than Mix 10.

TABLE 8

| Mix | Ester Hardener (% on Resin) | Magnesia (% on Aggregate) | Hardness |
| --- | --- | --- | --- |
| 1 | gamma-butyrolactone | MagChem 200D (2) | 1 |
| 2 | propylene carbonate | MagChem 200D (3) | 2 |
| 3 | gamma-butyrolactone | MagChem 200D (1.5) | 3 |
| 4 | gamma-butyrolactone | MagChem 50 (3) | 4 |
| 5 | diethyl oxalate | MagChem 50 (3) | 5 |
| 6 | mixture of 1:1 ethylene and propylene carbonate | MagChem 50 (3) | 8 |
| 7 | propylene carbonate | MagChem 50 (3) | 8 |
| 8 | none used | MagChem 200D (3) | 2 |
| 9 | none used | MagChem 200D (2) | 6 |
| 10 | gamma-butyrolactone at 10% on resin | MagChem 200D (2) | 4 |
| 11 | gamma-butyrolactone | MagChem 200D (1.5) | 3 |
| 12 | dimethyl oxalate | MagChem 200D (2) | 7 |
| 13 | ethylene carbonate | MagChem 200D (2) | 8 |
| 14 | gamma-butyrolactone | MagChem 200D (2) | 1 |
| 15 | none used | MagChem 200D (3) | 1 |
| 16 | none used | MagChem 200D (2) | 5 |
| 17 | none used | MagChem 200D (1) | 5 |

EXAMPLE 9

This example was run to show the effect of using differing: formaldehyde to phenol molar ratios; esters; magnesia quantities; and magnesia surface areas on the working time and hardness of the compositions. The compositions were plug mixes as described hereinbefore. The quantity of ester, based on the weight of resin, used in the mixes was 15%, except that Mix 9 contained an inert organic diluent, namely, 2-methoxyethyl ether, in place of the ester. Under the "Ester" heading in the following Table 9: "B" represents gamma-butyrolactone; "I" represents isobutyl formate; "T" represents triacetin; and "M" represents the 2-methoxyethyl ether.

The quantity of magnesia was 20%, based on the weight of resin, except for Mix 8 which contained only 16% of the magnesia and Mix 11 which contained only 15% of the magnesia. Mix 7 contained an additional 20% of both ester and resin, based on the weight of aggregate. Mix 1 of Table 9 is similar to Mixes 1 and 17 in Table 5 except that the work was done at different times and the batches of resin were probably different. The hardness is provided in Shore "D" hardness after 6 hours at room temperature (RT) and after 24 hours at room temperature.

In Table 9, Resin E had: a F/P molar ratio of 1.50; a weight average molecular weight of 539; and based on the weight of resin, a solids content of 67.7%, 12% water, 18% free phenol; and a viscosity of 946 centistokes at 25 C. Resin F had: a F/P molar ratio of 1.50; a weight average molecular weight of 539; and, based on the weight of resin, a solids content of 70.6%, a water content of 11.0%, a free phenol content of 16% and a viscosity at 25° C. of 1447 centistokes. Resin G had: a F/P molar ratio of 1.50; a weight average molecular weight of 539; and, based on the weight of the resin, a solids content of 64.3%, a water content of 12.0%, a free phenol content of 22.0% and a viscosity at 25 C of 608 centistokes. Resins E, F, and G were all prepared from the same resin but had different amounts of water or phenol added thereto.

From Table 9, it can be seen that: (a) replacement of ester hardening agent B by inert solvent M dramatically reduces hardening capability, thus, Mix 1 is much harder than Mix 9; (b) increasing free phenol content of the resin at a fixed polymer molecular weight enhances workability, thus, Mix 11 has longer work time than Mix 5 and gives essentially equivalent performance to Mix 1; and (c) decreasing free phenol content in the resin or increasing MgO surface area leads to reduced work time in relation to resins having equivalent molecular weight and prepared at the same molar ratio.

TABLE 9

EFFECT OF RESIN F/P, ESTER, MAGNESIA SURFACE AREA AND MAGNESIA LEVEL ON HARDNESS AND WORK TIME

| Mix | Resin | Ester | MgO Surface Area m²/g | Approx Work Time Min | Shore "D" Hardness 6 Hr/RT | 24 Hr/RT |
|---|---|---|---|---|---|---|
| 1 | C | B | 65 | 25–30 | 35 | 70 |
| 2 | E | B | 65 | 15–20 | 65 | 80 |
| 3 | E | B | 25 | 15–20 | 60 | 80 |
| 4 | E | I | 25 | 10–15 | 75 | 80 |
| 5 | E | T | 25 | 15–20 | 60 | 80 |
| 6 | E | T | 65 | 15–20 | 75 | 80 |
| 7 | F | T | 65 | 15–20 | 70 | 80 |
| 8 | E | T | 65 | 15–20 | 80 | 80 |
| 9 | C | M | 65 | 30–35 | * | 30 |
| 10 | D | T | 150 | <10 | 65 | 80 |
| 11 | G | T | 25 | 20–25 | 40 | 70 |

*Was too soft to measure

What is claimed is:

1. A raw batch composition comprising a mixture of:
   A. an aggregate;
   B. a curable phenol-formaldehyde resole resin having about 15% to 25% by weight of free phenol, a formaldehyde to phenol molar ratio of from about 1 to 1.5 moles of formaldehyde bound with each mole of phenol, a pH of about 4.5 to 9, a solids content of about 40% to 80% and a viscosity of about 150 to 1,500 cps at 25° C., the quantity of said resin being sufficient on hardening at room temperature to bind the composition;
   C. from about 15% to 45%, by weight of the resin, of lightburned magnesium oxide hardener having a surface area of at least 20 square meters per gram; and
   D. from about 5% to 40% by weight, based on the weight of the resin, of an ester functional hardening agent selected from the group consisting of a carboxylic acid ester, a lactone, a cyclic organic carbonate, and mixtures thereof.

2. The composition of claim 1 wherein the quantity of the resin is from about 3% to 15% by weight of the aggregate, the pH of the resin is from about 5 to 9 wherein the composition has a working time of at least 15 minutes at 23° C. and hardness on standing at said temperature within 24 hours to a tensile strength of at least 75 psi as measured at 25° C.

3. The composition of claim 2 wherein the quantity of ester is from 10% to 25%, the resin viscosity is from about 200 to 700 cps at 25° C., the quantity of magnesium oxide is from about 20% to 35% and the molar ratio of formaldehyde to phenol bound in said resin is from about 1 to 1.3 moles of formaldehyde for each mole of phenol.

4. The composition of claim 3 wherein the resin solids are from about 60% to 75%, the resin has a weight average molecular weight of about 200 to 500 and the amount of free phenol is from about 15% to 20% and the surface area of the oxide is from about 20 to 125 square meters per gram.

5. A method for making a shaped article which comprises mixing:
   A. an aggregate;
   B. a phenolic resole resin having a pH of about 5 to 9 in an amount sufficient to bind the aggregate upon hardening of the resin at room temperature, said resin containing about 15% to 25% by weight of free phenol and having bound therein from about 1 to 1.5 moles of formaldehyde per mole of bound phenol, a viscosity of about 150 to 1,500 cps at 25° C. and from about 40% to 80% solids;
   C. from about 5% to 40%, by weight of the resin, of an ester functional hardening agent selected from the group consisting of a carboxylic acid ester, a lactone and a cyclic organic carbonate;
   D. a lightburned magnesium oxide hardener having a surface area of about 20 to 200 square meters per gram in an amount sufficient to provide at least 15 minutes of working tie at 23° C. and to harden the mixture on standing at 23° C. to a tensile strength of at least 75 psi at 25° C. within 24 hours; and
   E. permitting the mixture to harden at a temperature of from about 18° C. to 32° C. to said tensile strength within 24 hours.

6. The method of claim 5 wherein the resin is the reaction product of phenol and formaldehyde wherein about 1 to 1.3 moles of formaldehyde are bound in the resin for each mole of phenol, the resin contains from about 15% to 20% of free phenol, the quantity of magnesium oxide is from about 15% to 35%, based on the weight of resin.

7. The method of claim 6 wherein the ester is a lactone.

8. The method of claim 6 wherein the ester is a carboxylic acid ester.

9. The method of claim 6 wherein the ester is a cyclic organic carbonate.

10. The method of claim 6 wherein: the aggregate member selected from the group consisting of magnesia, alumina, zirconia, silica, silicon carbide, silicon nitride, boron nitride, bauxite, quartz, corundum, zircon sand, olivine sand and mixtures thereof; and the article includes an additive selected from the group consisting of from about 5% to 25% of graphite based on the weight of aggregate, and 1% to 5%, by weight of the aggregate, of a metal powder selected from the group consisting of aluminum, magnesium, and silicon, and mixtures of said additives.

11. The method of claim 10 wherein the mixture is hardened at a temperature of about 18° C. to 32° C. to make a shaped article and the shaped article is subsequently thermally cured.

12. The method of claim 11 wherein the thermally cured article is subsequently carbonized.

13. A thermally cured composition prepared by the method of claim 11.

14. A shaped refractory article bound with a phenol formaldehyde resole resin, said article comprising in the uncured state of the resin a mixture of:
  A. an aggregate material selected from the group consisting of silica, alumina, magnesia and mixtures thereof;
  B. a curable phenolic resole resin having bound therein about 1 to 1.3 moles of formaldehyde for each mole of phenol, about 15% to 20% of free phenol, a pH of about 5 to 8.5, a solids content of about 40% to 80% by weight of the resin, at least 10% of water, by weight of the resin, and a viscosity of about 150 to 1,500 cps at 25° C., the quantity of said resin being from 3% to 15%, by weight of the aggregate; and
  C. from about 15% to 45%, based on the weight of the resin, of lightburned magnesium oxide hardener having a surface area of about 20 to 125 square meters per gram; and
  D. from about 5% to 45%, based on the weight of the resin, of an ester functional hardening agent selected from the group consisting of carboxylic acid esters, lactones and cyclic organic carbonates.

15. The shaped article of claim 14 wherein the quantity of magnesium oxide is from about 20 to 35% by weight of the resin and the quantity of ester is from about 5% to 25% by weight of the resin; the shaped article includes an additive selected from the group consisting of graphite and a metal powder selected from the group consisting of aluminum, magnesium and silicon, and mixtures of said additives and wherein at 23° C. the hardeners provide (a) at least 15 minutes of working time and (b) on standing for 24 hours at said temperature a tensile strength of at least 75 psi as measured at 25° C.

16. The shaped article of claim 14 wherein the resin contains less than 1% of water soluble sodium and potassium ions based on the weight of resin.

17. A thermally cured article of claim 15.

18. A carbonized article of claim 17.

* * * * *